United States Patent [19]

Shepard et al.

[11] Patent Number: 4,846,295
[45] Date of Patent: Jul. 11, 1989

[54] STEERABLE MOTORIZED THREE-WHEELED VEHICLES FOR USE BY THE HANDICAPPED AND OTHERS DESIRING ASSISTANCE

[75] Inventors: Melvin E. Shepard, Bridgeport; Allen L. Bussinger, Saginaw, both of Mich.

[73] Assignee: Amigo Sales, Inc., Bridgeport, Mich.

[21] Appl. No.: 179,747

[22] Filed: Apr. 11, 1988

[51] Int. Cl.$^4$ ............................................. B60R 18/02
[52] U.S. Cl. .................................. 180/68.5; 180/216; 180/907; 280/DIG. 5; 429/179
[58] Field of Search ...................... 180/68.5, 907, 216, 180/65.1; 280/DIG. 5; 429/1, 178, 179, 123

[56] References Cited

U.S. PATENT DOCUMENTS

| D. 285,187 | 8/1986 | Piziks et al. | D12/131 |
| 3,369,629 | 2/1968 | Weiss | 180/216 |
| 4,452,327 | 6/1984 | Mowat | 180/11 |
| 4,666,008 | 5/1987 | Shepard | 180/16 |
| 4,752,539 | 6/1988 | Vatter | 429/1 |
| 4,756,978 | 7/1988 | Nitcher et al. | 180/68.5 |

FOREIGN PATENT DOCUMENTS 1569967  6/1980  United Kingdom ................. 429/1

Primary Examiner—Kenneth R. Rice
Attorney, Agent, or Firm—Learman & McCulloch

[57] ABSTRACT

A steerable, electrically powered, three wheeled vehicle has a frame with a front end extending upwardly at a restricted angle. Laterally spaced apart rear wheels supporting the rear end, a steerable front wheel, journaled by the said front end for steerability, supports said front end. An elevated seat is supported on said rear end and a steering post connected to said front wheel extends upwardly at an angle at which it can be readily grasped by a seat occupant. Rechargeable batteries are carried in a well in a rear casing and the well and batteries have resilient contacts and terminals which automatically engage when the batteries are slipped into position in the well. An electric motor and drive mechanism is connected to drive said rear wheels, and demountable auxiliary wheels are detent secured to be driven with the rear wheels.

7 Claims, 5 Drawing Sheets

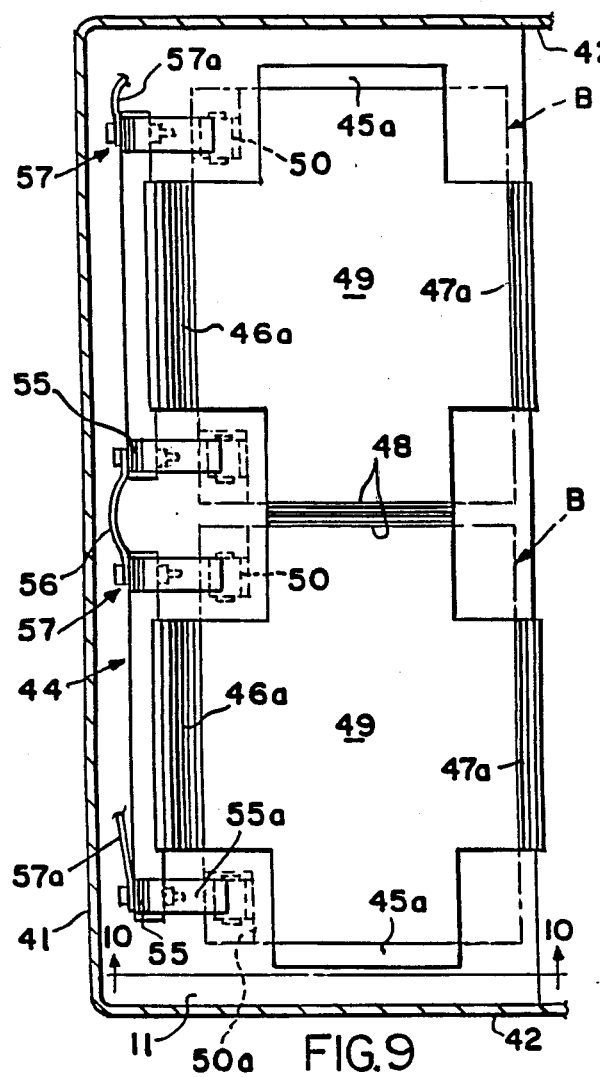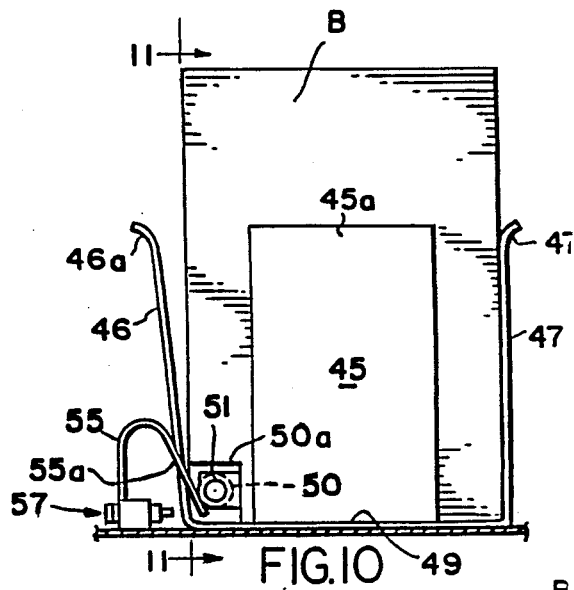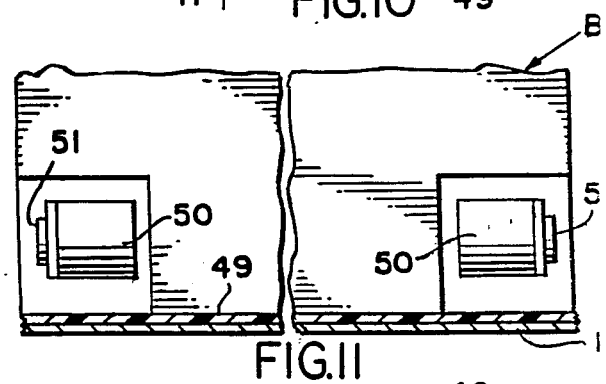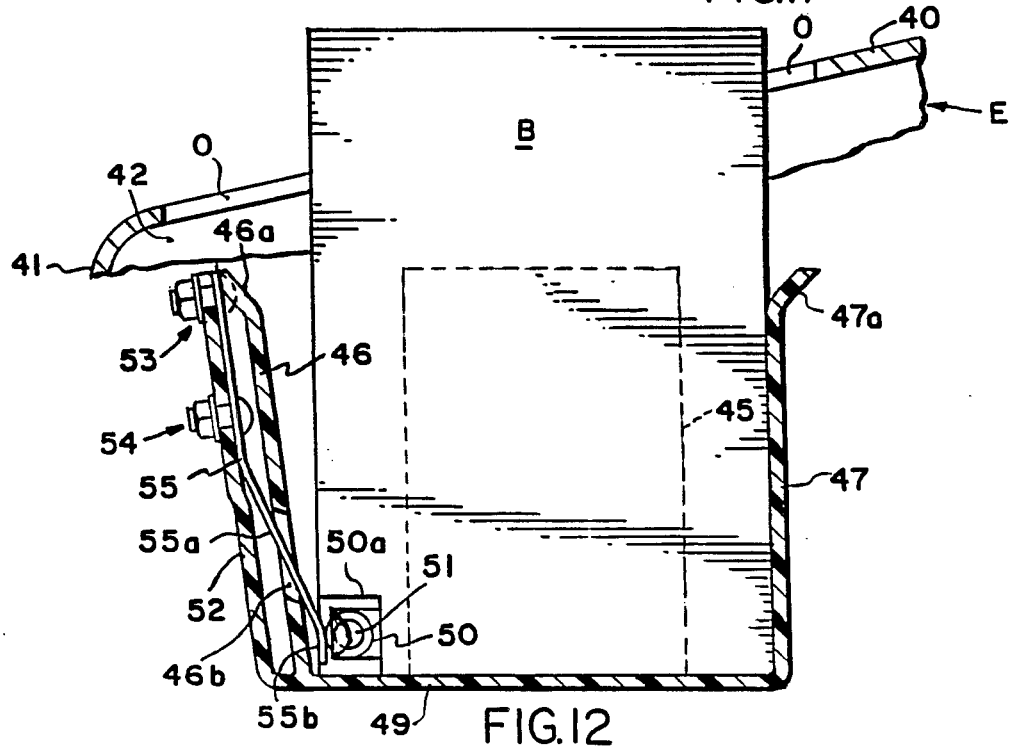

STEERABLE MOTORIZED THREE-WHEELED VEHICLES FOR USE BY THE HANDICAPPED AND OTHERS DESIRING ASSISTANCE

BACKGROUND OF THE INVENTION

The present invention relates to steerable, electrically powered, three-wheeled vehicles of the type used by the handicapped and others desiring to ride and, more particularly, to certain new and useful improvements in such structures which render them better able to perform their functions. Front and rear wheel-driven, three-wheeled vehicles wherein a swiveable, vertically adjustable contour chair is supported on a post at the rear end of the vehicle and a steering post extends upwardly from the front of the vehicle to a position in which it can be readily grasped by the seat occupant, are well known and shown, for example, in U.S. Pat. Nos. 4,452,327 and 4,666,008. The present invention is directed to such a three-wheeled vehicle which is rear wheel driven, and compactly transports the batteries used to power the motor near the rear end of the vehicle below the contour chair supported thereon.

SUMMARY OF THE INVENTION

The present invention is concerned with the configuration of the vehicle frame to provide ample foot room and leg comfort, and rugged structural characteristics. A vehicle rear housing encases the motor and, at the same time, provides a battery compartment which has automatically engaging battery terminals. Readily attachable and detachable second wheels are provided for each side of the rear axle to increase the driving traction powering the vehicle.

It is a prime object of the present invention to design an improved, electrified vehicle of the type described which has very significantly improved the quality of life for many people around the world by enhancing their freedom, independence, and mobility.

A further object of the invention is to provide a vehicle of the character described which is of rugged and compact design and capable of easy maneuver in restricted spaces.

Another object of the invention to provide a safe, portable unit of the character described which can be readily and economically manufactured and marketed at very affordable prices.

It is a further object of the invention to provide an electrically driven vehicle powered by batteries which are carried on the vehicle in a slip-in compartment which has contacts for the terminals which are automatically engaged.

Still another object of the invention is to provide a dual wheel connection system which selectively permits the ready attachment and detachment of an extra set of driving wheels for the vehicle to permit its use on slick or uneven outdoor surfaces including ramps, as well as in inside and domestic areas.

Other objects and advantages of the invention will be pointed out specifically or will become apparent from the following description when it is considered in conjunction with the appended claims and the accompanying drawings.

IN THE DRAWINGS

FIG. 9 is an enlarged, fragmentary, sectional plan view more particularly illustrating the battery case well in the rear housing;

FIG. 10 is a sectional, end elevational view, taken on the line 10—10 of FIG. 9;

FIG. 11 is an enlarged, fragmentary, transverse sectional view taken on the line 11—11 of FIG. 10; and FIG. 12 is an enlarged, fragmentary, side elevational view partly in section, showing a battery situated in operating position in the battery well.

Figure 5:
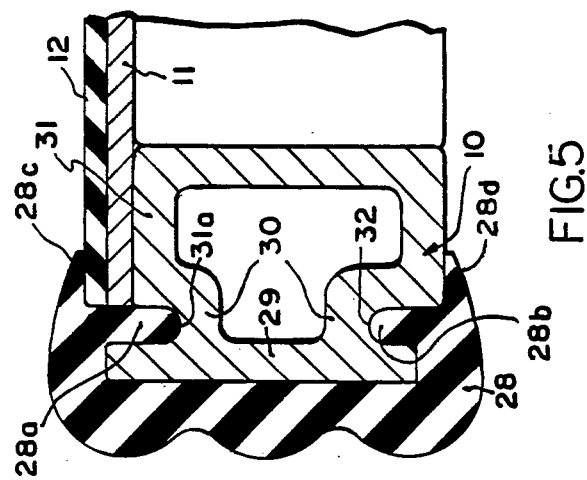
FIG. 5 is an enlarged, fragmentary cross-sectional view taken on the line 5—5 of FIG. 1.
Figure 1:
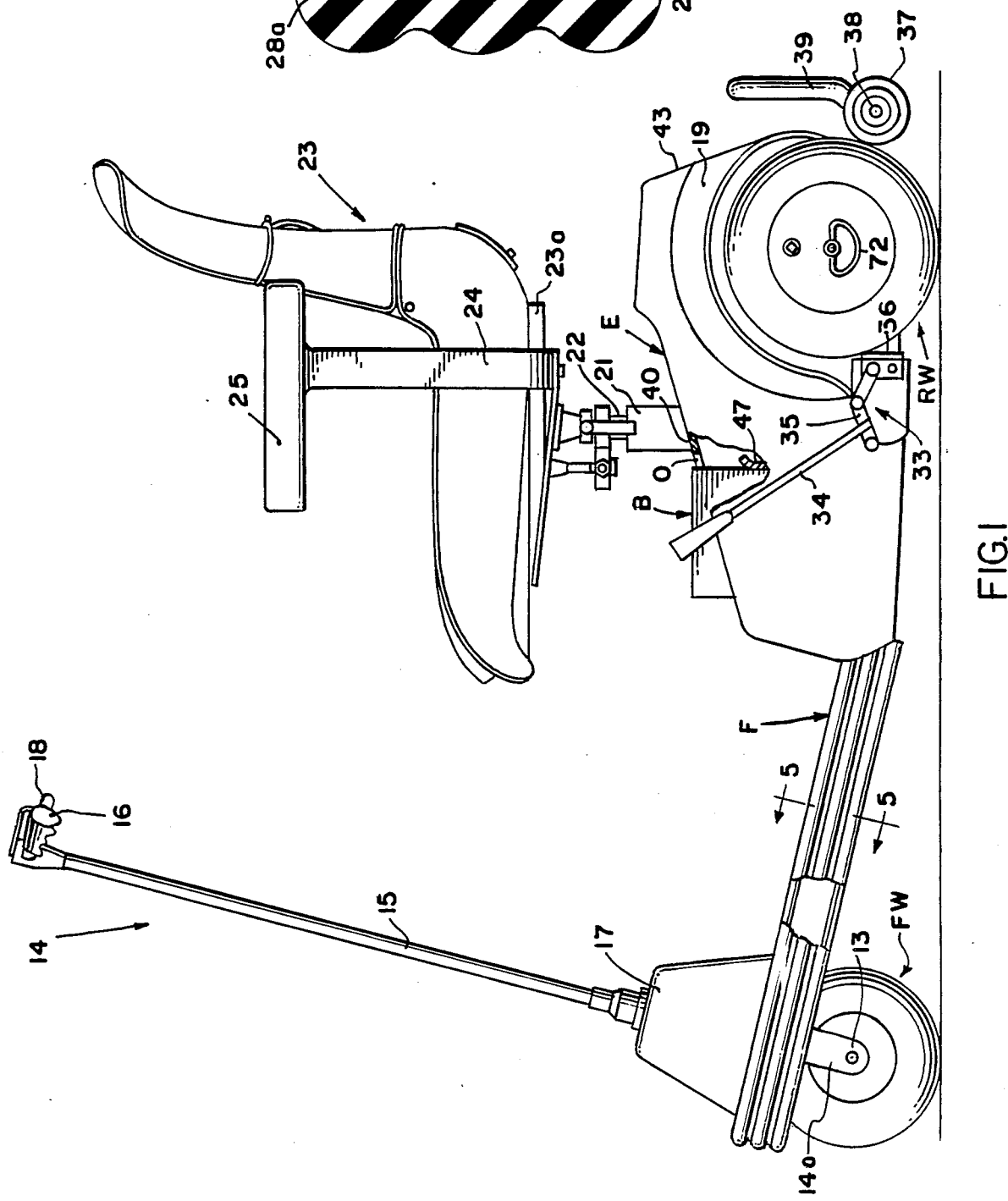
FIG. 1 is a side elevational view of the vehicle.

Referring now more particularly to the accompanying drawings, the motorized wheel chair of the present invention comprises a lightweight aluminum frame, generally designated F, which includes an aluminum extruded side rail section 10 of U-shape, when viewed in plan, which has side beams 10a extending rearwardly to a rear rail 10b adjacent the rear wheels of the vehicle, these wheels being generally designated RW. The rear wheels RW are of considerably larger diameter than the front wheel FW, which supports the upwardly angled front end 10 of the frame F. The upward angle of inclination from the substantially horizontal members 10a is a mere thirteen degrees which has been determined to provide maximum, leg position comfort in supporting the feet of a seated patient at the optimum foot rest slope. Frame section 10 is spanned by a metal platform base 11, overlaid with a rubber cover top 12.

The front wheel FW includes a front axle 13 supporting a steerable member 14 having dependent wheel forks 14a. The steering post 15, which has steering handle bar 16, and is journaled in a front casing 17, connects to the wheel fork member 14 to turn the front wheel FW in the desired direction. Start, stop and speed controls, generally designated 18, may be conveniently provided on the upper end of the steering post 15 adjacent the handle bar 16 in the usual manner, so as to be readily manipulated by the vehicle occupant. Such controls 18 will be electrically connected to the motor M driving rear wheels RW in any suitable manner.

Receiving and fixed to the rails 10a is an inverted shell-like enclosure or housing generally designated E, having integral rear fenders 19. The enclosure E houses or encases the schematically shown, electric drive motor unit M, which is drive pulley-connected to the differential rear axle 20 on which rear wheels RW are mounted. The differential assembly is shown at 20a.

Frame F also includes an upstanding socket 21 adapted to receive a seat post 22 which is secured to the bottom 23a of a contour seat, generally designated 23. Also secured to the bottom of seat 23 is a U-shaped member 24 which supports arm rests 25. A handle-operated mechanism, generally designated H, may be provided for locking the seat 23 in a particular position of swivel, and the seat 23 may be power operated to move up and down at the touch of a switch.

Figure 3:
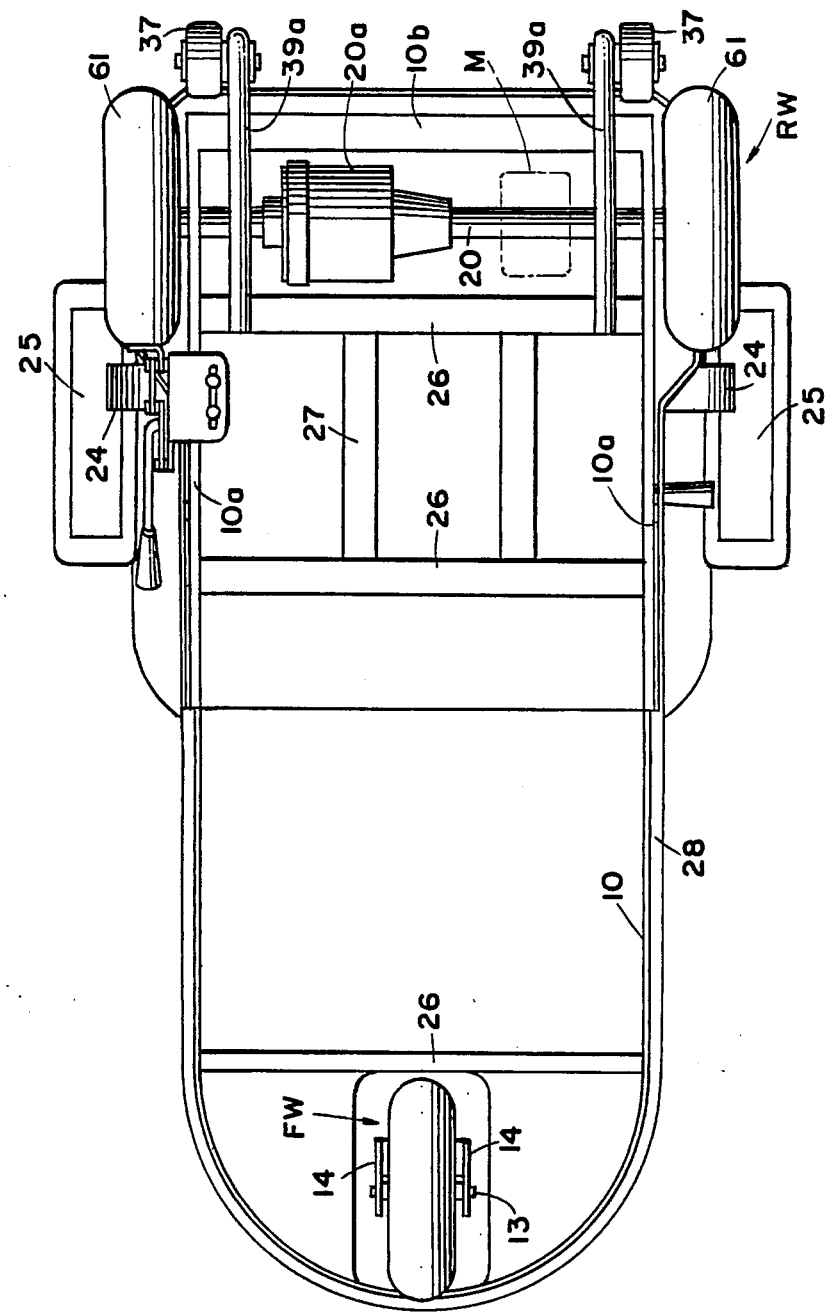
FIG. 3 is an under plan view of the vehicle with the auxiliary wheels removed.

As FIG. 3 particularly indicates, the side rails 10a are bridged by cross brace members 26 connected by frame members 27. A rubber bumper 28 extends around rail 10 forwardly of enclosure E. For this purpose, side rail 10 is formed, as indicated in FIG. 5, with an outer wall 29, integrated with inset outwardly extending bridge portions 30 which protrude from the generally C-shaped, in section, body portion 31 of the rail 10. The insetting of the legs 30 provides a relatively deep, continuous upper groove 31a and continuous lower groove 32. It will be seen that the bumper 28 has an upper tongue 28a and a lower tongue 28b for reception in the grooves 31a and 32, respectively. Bumper 28 also includes an inwardly extending upper lip 28c extending to fit over the top 12, and an inwardly extending lip 28d extending to fit over the portion 30. The rail 10 which provides a curvilinear front section joining its side sections is of uniform cross section to permit the bumper strip 28, which also is of uniform cross section, to tightly secure via the continuous grooves 31a and 32. The bumper strip 28 must be stretched to dispose it in the assembled position in which it is shown in FIG. 5.

Figure 2:
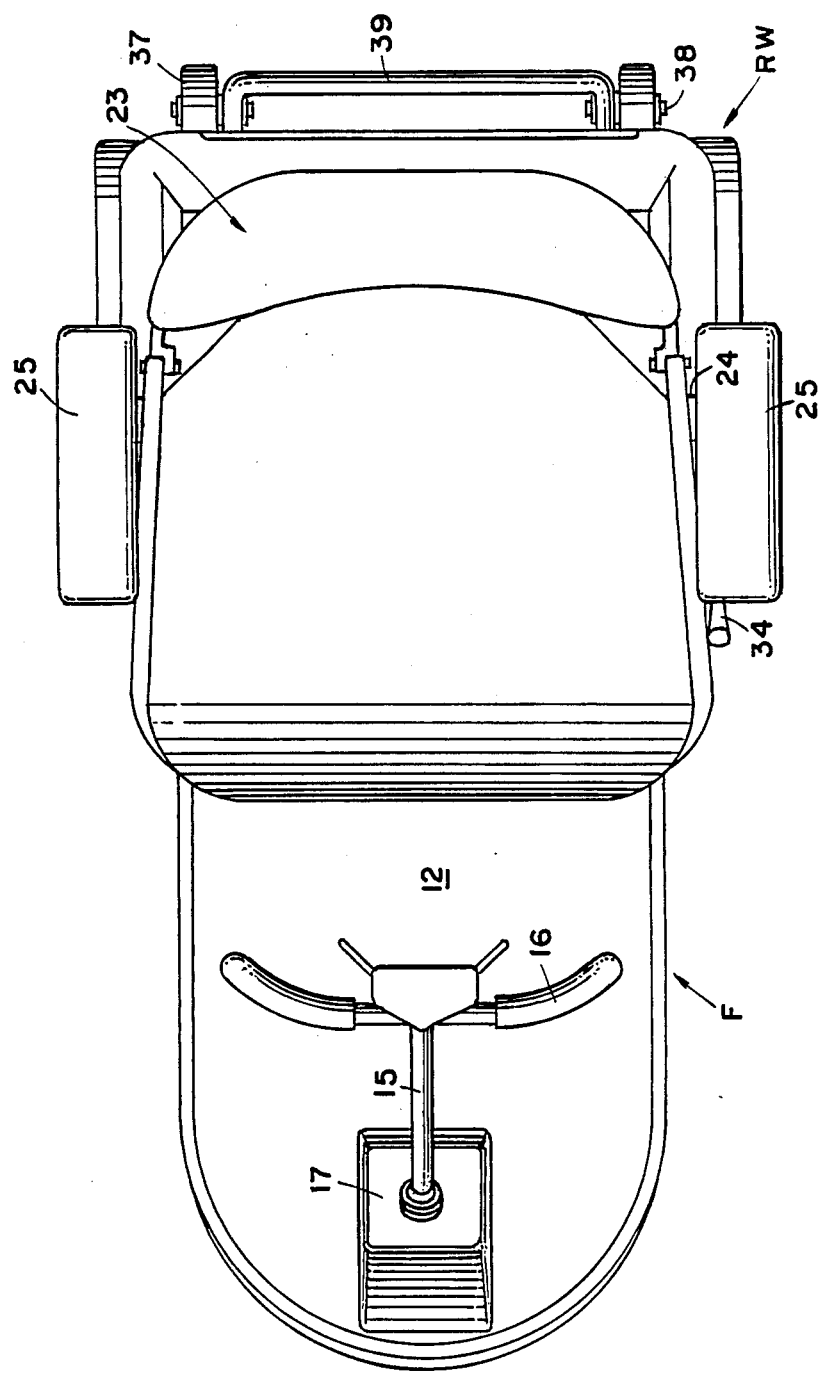
FIG. 2 is a top plan view thereof, with a portion of the seat broken away to show the battery receiving well provided in the rear housing, and with the detachable rear auxiliary wheels removed.

As FIG. 2 discloses, plenty of room for the patient's feet is provided laterally adjacent the front housing 17, and the upward slope of the floorboards 11 and 12 is relatively gentle. The housing 17 is fixed to the floorboard 11 and does not turn with the steering post 15, as in many previous vehicles of this type, because the wheel fork member 14, which detachably connects to the lower end of steering post 15, turns relative to casing 17.

Also provided on the vehicle, but forming no part of the present invention, is a hand brake, generally designated 33, including a brake handle 34, linkage 35, and a rear wheel engaging pad 36. A set of relatively small diameter, anti-tip rollers 37 are also journaled on axles 38 carried by a vertically U-shaped frame, generally designated 39, having projecting horizontal ends 39a fixed to frame members 26 and 10b. Frame 39, as well as preventing tip-over, forms a convenient handle for lifting the frame F.

FIGS. 7-10 particularly show the manner in which rechargeable twin batteries or power cells B for powering the motor M, are received in the well opening O provided in the enclosure E. Well O is formed in an upper wall 40 of the enclosure E, which has a front wall 41, side walls 42, and a rear wall 43. Inwardly of the front wall 41 of the enclosure E battery-receiving receptacles 44, with spreadable resilient side walls 45 and spreadable resilient front and rear walls 46 and 47, respectively, are secured in side-by-side relation within the well O. The walls 45-47 have outturned pilot flanges 45a, 46a, and 47a, respectively. The receptacle walls 45-47 and inner side walls 48, together with bottom walls 49, spread to snugly receive the twin, twelve volt batteries B. Provided at the lower end of each of the batteries B, as disclosed in FIG. 10, is a recess 50a, within which a roller terminal 50 is rotatably mounted on a post shaft 51.

FIG. 10 discloses one way in which inversely U-shaped spring terminal strips, generally designated 55, are maintained in engagement with each of the rollers 50. Here separate insulated terminal blocks 56 with wire lead mounting bolt and nut assemblies 57 are provided for also mounting the electrically conductive spring strips 55 which have extending ends 55a extending through openings 46b in wall 46. The ends 55a are displaced outwardly when engaged by the electrically conductive rollers 50 of the batteries at the time the batteries are inserted. Thus, the bias of ends 55a maintains the ends 55a in engagement with the pair of rollers 50 provided on each battery B. Connecting conducting strap 56 functions as the lead spanning the bolt assemblies 57 of the strips 55, engaging the adjacent terminal rollers 50 of batteries B, and is used for connecting the batteries B in series. Wires 57a connected to the nut and bolt assemblies 57 at the opposite ends of the battery receiving compartment O, lead to the motor M.

An alternate embodiment of spring strip 55 is illustrated in FIG. 12, wherein a front wall 52 has bolt and nut assemblies 53 and 54 fixing conductive spring strip 55 in position at each end of each battery B. The lower end of each spring strip 55 includes an inwardly angled portion 55a, extending through a slotted opening 46b in the wall 46, and a downwardly extending terminal flange 55b. The angularity of the portion 55a of each spring strip 55 is such that when it is engaged by a roller 50 as shown in FIG. 12, it is forced outwardly from its normal position. Thus, it is always in a position of bias in which it maintains contact with the roller 50 with which it engages.

Figure 7:
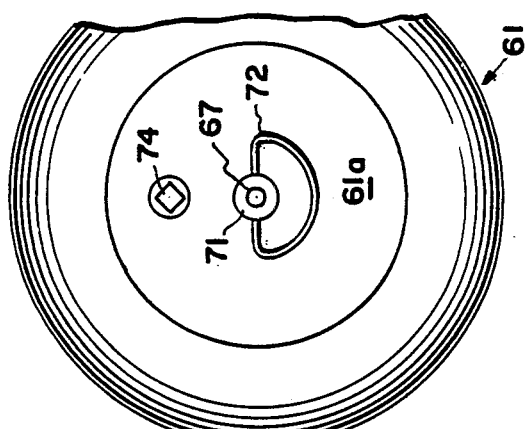
FIG. 7 is a fragmentary, transverse sectional view taken on the line 7—7 of FIG. 6.
Figure 6:
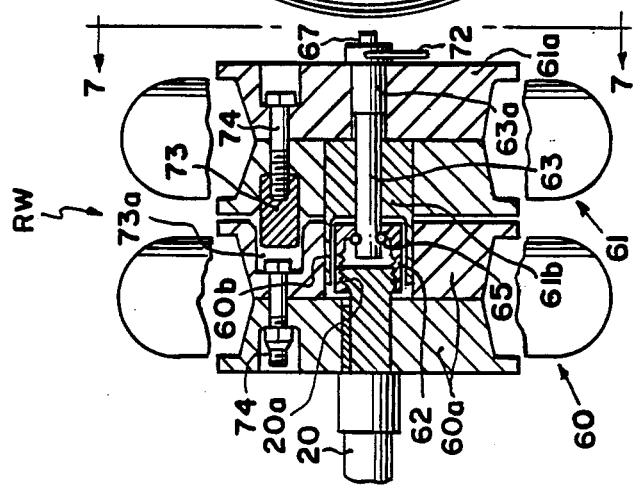
FIG. 6 is an enlarged, fragmentary, rear elevational view of the dual-wheel unit only.
Figure 8:
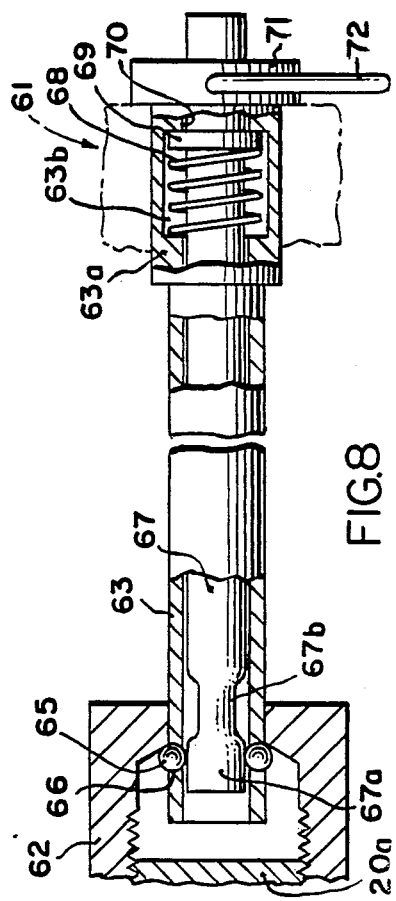
FIG. 8 is a considerably enlarged, fragmentary, sectional elevational view illustrating the auxiliary wheel releasing device.
Figure 4:
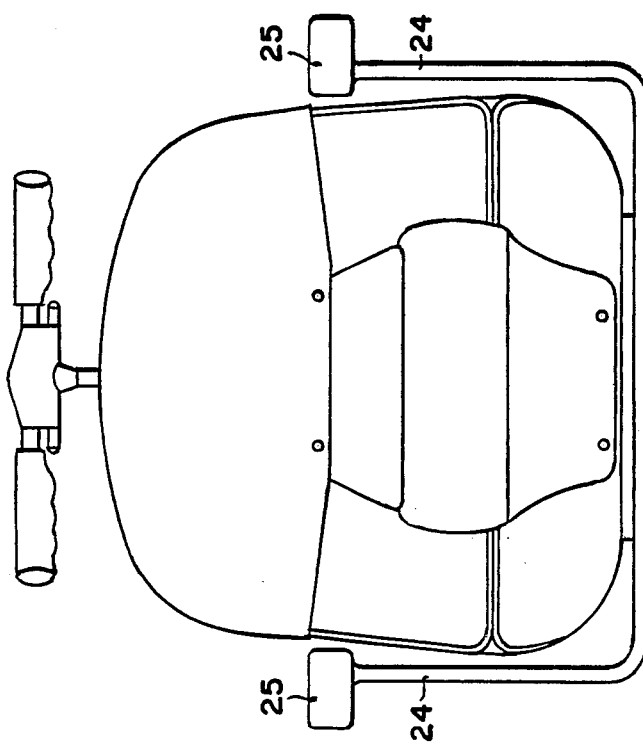
FIG. 4 is a rear elevational view of the vehicle.

FIGS. 6-8 particularly disclose the rear wheel structure for attachment of auxiliary outer wheels to the axle 20. As particularly FIG. 6 indicates, the sets of rear wheels RW each includes the regular inner wheel 60 and an outer wheel 61, which is demountably secured in a manner to now be described. The wheel 60 has a hub 60a which is keyed to the threaded end 20a of axle 20 at each end, and it will be observed that each axle end 20a receives a threaded sleeve 62. A lock sleeve 63 mounts circumferentially spaced ball detents 65 which are trapped in recesses 66 provided in the sleeve 63 and normally lock sleeves 63 in position. Mounted to extend within sleeve 63 is a spring pressed plunger member 67 having a head end 67a and a reduced diameter necked in portion 67b. The opposite end of sleeve 63 is enlarged as at 63a to provide an enlarged spring well 63b for receiving a coil spring 68 which bears against a collar 69 fixed on the plunger 67. At its outer end, plunger 67 extends through an opening 70 formed in the outer end of enlarged sleeve portion 63a and through a collar 71 fixed to the hub 61a of wheel 61, from which handle 72 protrudes. The hub portions 60a and 61a of the wheels 60 and 61 at each side of the vehicle are keyed together so that wheels 60 drive wheels 61 in any suitable manner. For instance, coupler sleeves 73 carried by the hubs 61a are shown in FIG. 6 as extending into the sockets 73a provided in hubs 60a. The screws 74 secure the sleeves 73 as well as secure the halves of wheel hubs 61a. The hub extension 61b of auxiliary wheel 61 is received in the axial opening 60b provided in the hub 60a of wheel 60.

THE OPERATION

To remove the wheels 61 to facilitate indoor operation of the vehicle, it is merely necessary to depress plungers 67 to bring the balls 65 into register with the necked-in portions 67b. This permits the balls 65 to move radially inwardly, as withdrawal pressure is exerted, and the sleeves 63 are consequently released for movement out of the threaded sleeves 62. Reattachment is similarly accomplished by depressing plungers 67 and guiding the sleeves 63 into the threaded sleeves 62 in a position in which the coupler sleeves 73 are circumferentially aligned with the sockets 73a in hubs 60a. With release of the plungers 67, springs 68 restore the plungers 67 to the FIG. 8 position in which the balls 65 project radially.

The batteries B can be readily simply slipped into exact operative position, after a recharge, by inserting them in side-by-side relation into well O. No reattachment of leads is necessary, and no unclamping is necessary when it is desired to simply lift the batteries B out for recharging. Because the batteries are held in position by a spring clamp, they do not rattle or cause vibration as the vehicle moves over uneven ground.

While only several embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

What is claimed is:

1. A steerable, powered, three wheeled vehicle comprising:
   a. a U-shaped-in-plan frame rail defining a curvilinear front end and side sections joined angularly to a generally horizontal rear frame section; the said frame rail extending upwardly from the rear frame section at a restricted angle in the neighborhood of 13 degrees;
   b. a platform spanning said front end and side sections;
   c. laterally spaced apart rear wheels supporting the rear frame section;
   d. a front shell-like casing supported on said front end in stationary position to leave ample foot room on said platform laterally outwardly of said front casing;
   e. a steerable front wheel, journaled by the said front end for steerability, and supporting said front end;
   f. an elevated seat supported on said rear frame section;
   g. a steering post connected to said front wheel and extending upwardly at an angle at which it can be readily grasped by a seat occupant whose feet are resting comfortably on said platform;
   h. rechargeable batteries carried on the rear frame section of said vehicle;
   i. electric motor and drive mechanism on said rear frame section connected to drive said rear wheels;
   j. a resilient bumper strip for said frame rail configured to interfit with said frame rail and extending around said side sections and front end;
   k. an inverse shell-like rear casing spanning said rear frame section to house said drive mechanism and extending forwardly to said bumper strip, said seat being mounted on a post extending upwardly out of said casing;
   l. a battery well provided in the upper wall of said casing just forwardly of said seat post to dispose the batteries under said seat; said well having contacts therein connected to said motor and drive mechanism; and said batteries having terminals in position to be automatically engaged with said contacts when the batteries are slipped into received position in said well;
   m. means provided for guiding said batteries into received position comprising battery receptacles with spreadable walls and flared upper piloting edges;
   n. said contacts comprising resilient strips extending into said wells to be deformed when engaged by said battery terminals; said strips being connected in series; and
   o. said battery terminals being rotatably mounted rollers provided in recessed portions at the bottoms of the batteries.

2. A steerable, powered, three-wheeled vehicle comprising:
   a. a frame comprising front end and side sections joined to a generally horizontal rear frame section;
   b. a platform spanning said front end and side sections;
   c. laterally spaced apart rear wheels supporting the rear frame section;
   d. a front shell-like casing supported on said front end in stationary position to leave ample foot room on said platform laterally outwardly of said front casing;
   e. a steerable front wheel, journaled by the said front end for steerability, and supporting said front end;
   f. an upright post mounted on said rear frame section and having an elevated seat extending forwardly from said post;
   g. a steering post connected to said front wheel and extending upwardly at an angle at which it can be readily grasped by a seat occupant whose feet are resting comfortably on said platform;
   h. rechargeable batteries carried on the rear frame section of said vehicle;
   i. electric motor and drive mechanism on said frame section connected to drive said vehicle by revolving said wheels;
   j. an inverse shell-like rear casing spanning and frame;
   k. said rear casing having a battery well therein disposed beneath said seat forward of said seat post;
   l. said well having a receptacle with a rectilinear bottom sized to snugly receive said batteries and further having laterally separated individually upright resilient side, front, and rear walls, the front wall being upwardly and forwardly inclined and having a forwardly flared piloting outer flange thereon; resilient electrical contacts extending into said receptable and connected to said motor and drive mechanism; and said batteries having terminals in position to be automatically engaged with said contacts when the batteries are slipped into received position in said well.

3. The invention defined in claim 2 wherein said contacts comprise resilient strips extending into said wells to be deformed when engaged by said battery terminals; said strips being connected in series.

4. The invention defined in claim 3 wherein said rear casing has an upper wall and said well is provided therein, and said battery terminals are rotatably mounted rollers provided in recessed portions at the bottoms of the batteries.

5. A steerable, powered, three wheeled vehicle comprising:
   a. a frame comprising a front end and side sections joined to a generally horizontal rear frame section;
   b. a platform spanning said frame;
   c. a pair of laterally spaced apart rear wheels supporting the rear frame section;
   d. a steerable front wheel supporting said front end;
   e. an upright support post mounted on said rear frame section;
   f. an elevated seat supported on said post;

g. a steering post connected to said front wheel and extending upwardly at an angle at which it can be readily grasped by a seat occupant;

h. a rechargeable battery unit carried on the rear frame section of said vehicle and having lower recessed portions with terminals therein;

i. electric motor and drive mechanism connected to drive said vehicle by revolving said wheels;

j. an inverse shell-like casing on the rear end of said frame having a battery well therein with electrical contacts connected to said electric motor and drive mechanism;

k. a battery receptacle within said well comprising spaced apart spreadable battery unit embracing guide walls, with outer piloting edges, for guiding said battery unit into a predetermined received position; and l. said contacts comprising resilient strips extending into said well to be deformed when engaged by said battery terminals, and said battery terminals being rotatably mounted rollers provided in said recessed portions in the battery unit.

6. A steerable, powered, three-wheeled vehicle comprising:

a. a frame comprising a front end and side sections joined to a generally horizontal rear frame section;

b. a platform spanning said frame;

c. a pair of laterally spaced apart rear wheels supporting the rear frame section;

d. a steerable front wheel supporting said front end;

e. an upright support post mounted on said rear frame section;

f. an elevated seat supported on said post and extending forwardly thereof;

g. a steering post connected to said front wheel and extending upwardly at an angle at which it can be readily grasped by a seat occupant;

h. a rechargeable battery unit carried on the rear frame section of said vehicle and having lower portions with exposed terminals;

i. electric motor and drive mechanism connected to drive said vehicle by revolving said wheels;

j. an inverse shell-like casing on the rear end of said frame having a battery well under said seat, with electrical contacts therein connected to said electric motor and drive mechanism;

k. a battery receptacle within said well comprising a lower end sized to snugly receive said unit and laterally spaced apart, spreadable, battery unit embracing guide walls, with piloting means, for guiding said battery unit into a predetermined received position in which said unit is received in the lower end of the receptacle and said terminals and contacts are electrically engaged; and l. said contacts and terminals including electrically conductive resilient strips and electrically conductive members for engaging them.

7. The vehicle defined in claim 6 wherein said piloting means includes an upwardly and forwardly inclined front wall with an upwardly and forwardly inclined upper flange thereon.

* * * * *

UNITED STATES PATENT AND TRADEMARK OFFICE
CERTIFICATE OF CORRECTION

PATENT NO.  : 4,846,295
DATED       : July 11, 1989
INVENTOR(S) : Melvin E. Shepard and Allen L. Bussinger It is certified that error appears in the above-identified patent and that said Letters Patent is hereby corrected as shown below:

Column 2, line 10, cancel "sectional".

Column 3, line 44, change "7-10" to -- 9-12 -- .

Column 3, line 56, change "48" to -- 45 -- .

Column 5, line 11, insert -- formed by the resilient walls of battery receptacle 44 -- after "clamp".

Column 6, line 34, change "and" to -- said -- .

Signed and Sealed this

Nineteenth Day of December, 1989

Attest:

JEFFREY M. SAMUELS

Attesting Officer        Acting Commissioner of Patents and Trademarks